Patented Dec. 21, 1943

2,337,271

UNITED STATES PATENT OFFICE 2,337,271

SATURATED AND UNSATURATED 17-FORMYL - CYCLOPENTANOPOLYHYDRO-PHENANTHRENES

Tadeus Reichstein, Zurich, Switzerland, assignor, by mesne assignments, to Ciba Pharmaceutical Products, Incorporated, Summit, N. J., a corporation of New Jersey No Drawing. Application July 25, 1938, Serial No. 221,238. In Switzerland July 25, 1937

6 Claims. (Cl. 260—397.4)

By this invention saturated and unsaturated derivatives of 17-formyl-cyclopentanopolyhydrophenanthrenes are obtained by converting in saturated or unsaturated derivatives of 17-carboxycyclopentanopolyhydrophenanthrenes the carboxyl group into the aldehyde group with aid of reducing agents.

The expression cyclopentanopolyhydrophenanthrene compounds includes for example compounds of the type of etio-cholane, estrane, hydro-estrane, or their stereoisomers. The etio-acids used as parent materials may contain further substituents in the ring system, for example free or substituted hydroxyl-, carbinol- and amino-groups, further keto-groups and their enol derivatives, such as enol ester and enol ether, halogen atoms or also hydrocarbon radicals. In addition to the carboxyl-group the 17-carbon atom may contain for example hydrogen and particularly a free or substituted hydroxyl group.

The reduction according to the present process may be carried out in known manner. Reference is made in this connection for example to the text-book "Die Methoden der organishen Chemie" of Houben-Weyl, 3rd edition, volume II, pages 237–293.

The procedure may consist in converting the carboxyl group into the acid chloride, if required after protecting oxy groups present in the ring system by acylation or etherification, and then subjecting the acid chloride to catalytic reduction. Or the acid may be converted into an acid anilide or substituted acid anilide, this may be converted by the action of phosphorus pentahalide into an imidohalide and the latter reduced, for example with stannous chloride and hydrochloric acid. Advantageously the product is then subjected to acid hydrolysis. Other known reducing agents, such as chromous salts are also suitable.

The reaction may be illustrated by way of example by the following scheme:

purposes or as intermediate products in the production of such substances.

The following example illustrates the invention, the parts being by weight:

Example 1 part of Δ⁵-3-acetoxy-etio-cholenic acid (melting point 242° C. corrected) is dissolved in 10 parts of benzene and the solution is cautiously boiled with 4 parts of thionyl chloride. After about 2 hours evolution of hydrogen chloride and sulfur dioxide has ceased. Should any sparingly soluble crystals have separated they are removed; they constitute the anhydride of the acetylated acid and may be reconverted into the parent product by saponification and acetylation. The benzene solution is evaporated under reduced pressure and the residue is dissolved in 20 parts of pure dry xylene. After addition of 1 part of palladium-barium sulfate (containing about 2 per cent of palladium) dry purified hydrogen is introduced into the solution at boiling temperature in a reflux apparatus and the effluent gas is passed through water containing some methyl orange. To this caustic soda solution is added gradually and thus the quantity of hydrogen chloride split off is determined. As soon as 50 per cent of the calculated quantity has been split off the process is interrupted. The reaction mixture is filtered, the filtrate is concentrated under reduced pressure to a small volume, a mixture of equal parts of dioxane and sulfuric acid of 20 per cent strength is added and the whole is heated to boiling for 1 hour in a reflux apparatus. Then the dioxane is removed as far as possible under reduced pressure with repeated addition of water, the reaction product is extracted with ether and from the ethereal solution the acid which has not entered into reaction is recovered (as the free oxy acid melting at 280° C., corrected, with decomposition) by extraction with sodium carbonate solution; it may be used for a fresh reaction. From the neutral product the Δ⁵-3-hy-

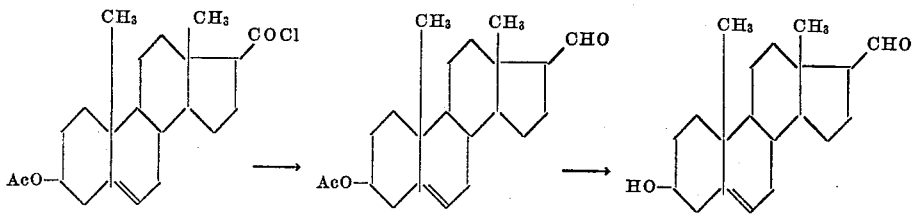

The products are useful for the preparation of substances which are valuable for therapeutical droxy-17-formyl-etio-cholene can be recovered in the usual manner either directly or after purification by way of the bisulfite compound or the semicarbazone. It may be recrystallized from a mixture of ether and pentane.

If the above described saponification is not carried out there is obtained $\Delta^5$-3-acetoxy-17-formyl-etio-cholene. In analogous manner there are also obtained other compounds esterified or etherified in 3-position in any desired manner.

What I claim is:

1. A compound of the group consisting of the saturated and unsaturated 17-formyl-17-H-cyclopentano - 10:13 - dimethyl-polyhydrophenanthrenes containing in 3-position a member of the group consisting of a free, an esterified and an etherified hydroxyl group.

2. A process for the manufacture of saturated and unsaturated 17-formyl-cyclopentanopolyhydrophenanthrenes, which comprises converting the carboxylic acid group of derivatives of saturated and unsaturated 17-carboxy-cyclopentanopolyhydrophenanthrenes into an acid halide group and then converting the latter into an aldehyde group with aid of a reducing agent capable of effecting such conversion.

3. The compounds of the following formula:

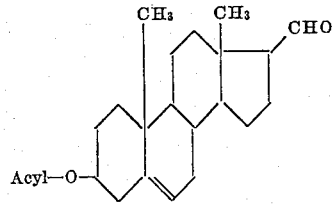

4. $\Delta^5$-3-hydroxy-17-formyl-etio-cholene.

5. $\Delta^5$-3-acetoxy-17-formyl-etio cholene.

6. A compound of the group consisting of the saturated and unsaturated 17-formyl-17-H-cyclopentano - 10,13-dimethyl - polyhydrophenanthrenes.

TADEUS REICHSTEIN.